United States Patent
Leng et al.

(10) Patent No.: US 11,550,096 B2
(45) Date of Patent: Jan. 10, 2023

(54) TRANSPARENT DISPLAY MODULE AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Shouyang Leng, Beijing (CN); Rui Han, Beijing (CN); Zeyuan Tong, Beijing (CN); Qing Ma, Beijing (CN); Dong Cui, Beijing (CN); Zhipeng Zhang, Beijing (CN); Bin Long, Beijing (CN); Wenyang Li, Beijing (CN); Zan Zhang, Beijing (CN); Yue Zhai, Beijing (CN); Dong Guan, Beijing (CN); Weining Chi, Beijing (CN); Fengping Wang, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/277,679

(22) PCT Filed: Jul. 13, 2020

(86) PCT No.: PCT/CN2020/101729
§ 371 (c)(1),
(2) Date: Mar. 18, 2021

(87) PCT Pub. No.: WO2021/017806
PCT Pub. Date: Feb. 4, 2021

(65) Prior Publication Data
US 2021/0349253 A1    Nov. 11, 2021

(30) Foreign Application Priority Data
Jul. 26, 2019  (CN) .......................... 201921193035.6

(51) Int. Cl.
*F21V 8/00* (2006.01)
*G02F 1/1335* (2006.01)
*G02F 1/1339* (2006.01)

(52) U.S. Cl.
CPC .......... *G02B 6/0085* (2013.01); *G02F 1/1339* (2013.01); *G02F 1/133528* (2013.01); *G02F 2202/28* (2013.01)

(58) Field of Classification Search
None
See application file for complete search history.

(56) References Cited

U.S. PATENT DOCUMENTS

| | | | | |
|---|---|---|---|---|
| 2014/0092339 A1* | 4/2014 | Yoshimura | ........ | G02F 1/133308 349/58 |
| 2014/0226106 A1* | 8/2014 | Sung Ki | ........... | G02F 1/133382 349/62 |
| 2019/0353840 A1* | 11/2019 | Wang | ................... | H05K 7/2099 |

FOREIGN PATENT DOCUMENTS

| CN | 105318636 A | 2/2016 |
|---|---|---|
| CN | 105446004 A | 3/2016 |

(Continued)

OTHER PUBLICATIONS

International Search Report and Written Opinion for International Application No. PCT/CN2020/101729 dated Oct. 19, 2020.

(Continued)

*Primary Examiner* — Phu Vu
(74) *Attorney, Agent, or Firm* — Perilla Knox & Hildebrandt LLP; Kenneth A. Knox

(57) ABSTRACT

A transparent display module and a display device are provided. The transparent display module includes a first transparent substrate and a second transparent substrate that are arranged opposite to each other, a transparent display panel and a light source. The transparent display panel is arranged between the first transparent substrate and the (Continued)

second transparent substrate. The light guide plate is arranged between the transparent display panel and the second transparent substrate. The light source is arranged between the transparent display panel and the second transparent substrate, and the light source is located on the side of the light guide plate.

19 Claims, 3 Drawing Sheets

(56) References Cited

FOREIGN PATENT DOCUMENTS

| | | | |
|---|---|---|---|
| CN | 105627676 A | | 6/2016 |
| CN | 205384422 U | * | 7/2016 |
| CN | 205450510 U | | 8/2016 |
| CN | 206627729 U | | 11/2017 |
| CN | 207081915 U | * | 3/2018 |
| CN | 109188744 A | | 1/2019 |
| CN | 109859643 A | | 6/2019 |
| CN | 109887427 A | | 6/2019 |
| CN | 209746992 U | | 12/2019 |
| CN | 210271570 U | | 4/2020 |
| CN | 210429131 U | | 4/2020 |
| JP | 2002091330 A | | 3/2002 |

OTHER PUBLICATIONS

Kai Hu et al., "Development of Transparent Display Technology," vol. 35, No. 6, Chinese J. of Electron Devices (Dec. 2012).

* cited by examiner

TRANSPARENT DISPLAY MODULE AND DISPLAY DEVICE

CROSS-REFERENCE TO RELATED APPLICATION

The present application is a national phase application under 35 U.S.C. § 371 of International Patent Application No. PCT/CN2020/101729, filed on Jul. 13, 2020 which claims the benefit of and priority to Chinese Patent Application No. 201921193035.6, filed on Jul. 26, 2019, the disclosures of which are incorporated by reference in their entireties herein.

TECHNICAL FIELD

The present disclosure relates to the technical field of transparent display elements and, in particular, to a transparent display module and a display device.

BACKGROUND

At present, more and more attention is being paid to transparent display technology, which can provide more convenient services to people in fields such as advertising windows and vehicles. Many manufacturers have begun to devote themselves to the research and development of the transparent display technology.

It should be noted that the information disclosed in the background section above is only used to enhance the understanding of the background of the present disclosure, and may include information that does not constitute the related art known to those ordinary skilled in the art.

SUMMARY

A first aspect of the present disclosure provides a transparent display module. The transparent display module includes two transparent substrates, a transparent display panel, a light guide plate and a heat dissipation structure. The two transparent substrates include a first transparent substrate and a second transparent substrate that are arranged opposite to each other. The transparent display panel is arranged between the first transparent substrate and the second transparent substrate. The light guide plate is arranged between the transparent display panel and the second transparent substrate. The light source is arranged between the transparent display panel and the second transparent substrate, and located at a side of the light guide plate. The light source is arranged between the light guide plate and the heat dissipation structure.

According to an embodiment of the present disclosure, the heat dissipation structure includes a heat dissipation frame. The heat dissipation frame is arranged on an outer periphery of the transparent display panel and the light guide plate, and an inner periphery of the heat dissipation frame includes a first end surface facing the side of the light guide plate, the light source is disposed on the first end surface, and is located between the side of the light guide plate and the first end surface.

According to an embodiment of the present disclosure, the inner periphery of the heat dissipation frame is provided with a protrusion, and the protrusion includes the first end surface and a second end surface facing the transparent display panel, an outer edge of the transparent display panel is disposed on the second end surface.

According to an embodiment of the present disclosure, the heat dissipation structure further comprises a heat pipe that is in direct contact with the heat dissipation frame.

According to an embodiment of the present disclosure, the heat pipe is disposed inside the heat dissipation frame.

According to an embodiment of the present disclosure, the transparent display panel includes: a first polarizer, an array substrate, a liquid crystal layer, a color filter, and a second polarizer that are stacked in sequence.

According to an embodiment of the present disclosure, the transparent display module further includes a circuit board disposed on a side of the heat dissipation frame facing a plane where the first transparent substrate is located, and the circuit board is configured to drive the transparent display panel.

According to an embodiment of the present disclosure, the heat dissipation structure further includes a heat pipe. The heat pipe is in direct contact with the heat dissipation frame, and disposed in a peripheral area of the circuit board, and the heat pipe is spaced apart from the circuit board.

Another aspect of the present disclosure provides a display device with a wall structure, and the wall structure is provided with a window. The window is provided with the transparent display module proposed in the present disclosure and described in the above embodiments.

According to an embodiment of the present disclosure, the wall structure includes a cavity, the outer edge of the transparent display module is arranged in the cavity, and at least a part of display area of the transparent display module is located in the window.

According to an embodiment of the present disclosure, a first sealant layer is provided in the cavity, and the first sealant layer is in a closed structure surrounding the outer periphery of the transparent display module and is provided between both side walls of the cavity; and/or, a second sealant layer having a ring-shaped closed structure is provided between the transparent display module and edge portions of the window defined in the wall structure.

It should be understood that the above general description and detailed description described hereinafter are only exemplary and explanatory, and not intended to limit the present disclosure.

This section provides an overview of various implementations or examples of the technology described in the present disclosure, and is not a comprehensive disclosure of the full scope or all features of the disclosed technology.

BRIEF DESCRIPTION OF THE DRAWINGS

By considering the following detailed description of various embodiments of the present disclosure in conjunction with the accompanying drawings, various objectives, features, and advantages of the present disclosure will become more apparent. The drawings are merely exemplary illustrations of the present disclosure and are not necessarily drawn to scale. In the drawings, the same reference numerals always indicate the same or similar parts. In the drawings.

DETAILED DESCRIPTION

Figure 1:
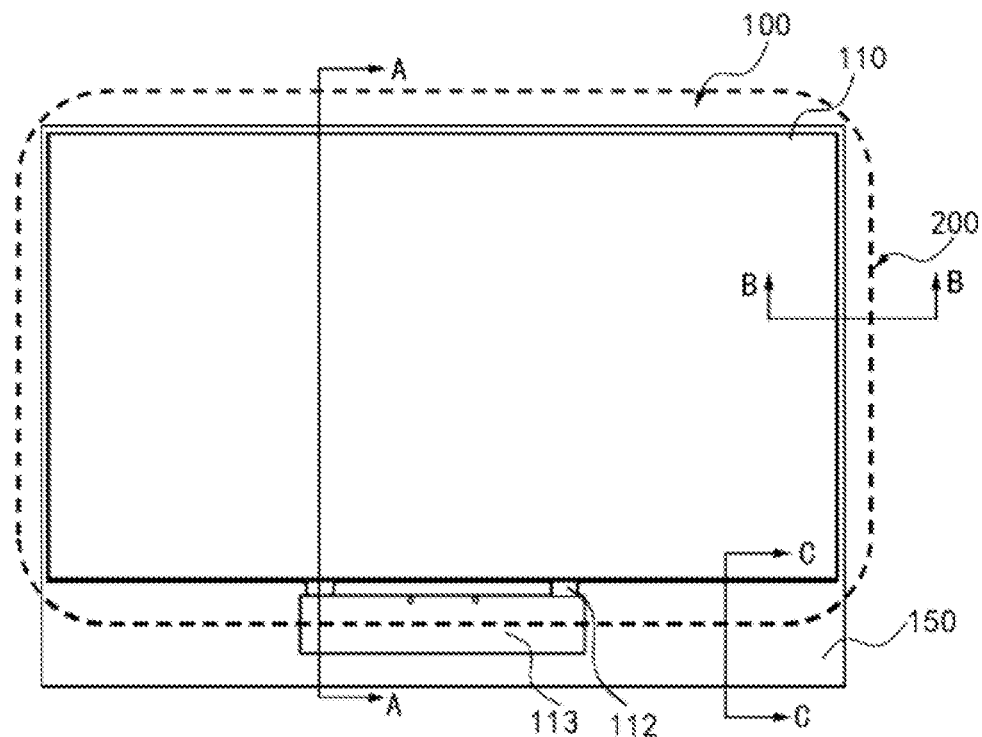
FIG. 1 is a schematic structural diagram showing a transparent display module according to an exemplary embodiment.

Typical embodiments embodying the features and advantages of the present disclosure will be described in detail in the description hereinafter. It should be understood that the present disclosure can have various changes in different embodiments, which do not depart from the scope of the present disclosure, and the description and drawings therein are essentially for illustrative purposes, rather than limiting the present disclosure.

Different exemplary embodiments of the present disclosure are described below with reference to the accompanying drawings, which form a part of the present disclosure, and in which different exemplary structures, systems and steps that can implement various aspects of the present disclosure are shown by way of example. It should be understood that other specific solutions of components, structures, exemplary devices, systems, and steps can be used, and structural and functional modifications can be made without departing from the scope of the present disclosure. Moreover, although the terms "above", "between", "within", etc. may be used in this specification to describe different exemplary features and elements of the present disclosure, these terms are used herein for convenience only, for example, according to an exemplary direction shown in the drawings. Nothing in this specification should be understood as requiring a specific three-dimensional direction of the structure to fall within the scope of the present disclosure.

Reference is made to FIG. 1, which is a schematic structural diagram exemplarily illustrating a transparent display module 100 proposed in the present disclosure. In the exemplary embodiment, as an example, the transparent display module 100 proposed in the present disclosure is described based on a structure of hollow glass 200. It is easy for those skilled in the art to understand that, in order to apply the relevant design of the present disclosure to other structures or display devices, various modifications, additions, substitutions, deletions or other changes are made to the specific embodiments described below. Such changes are also within the scope of the principle of the transparent display module 100 proposed in the present disclosure.

Figure 2:
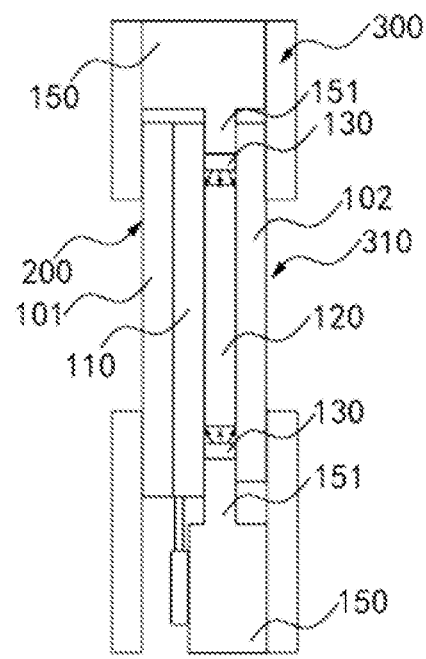
FIG. 2 is a cross-sectional view taken along line A-A in FIG. 1.
Figure 3:
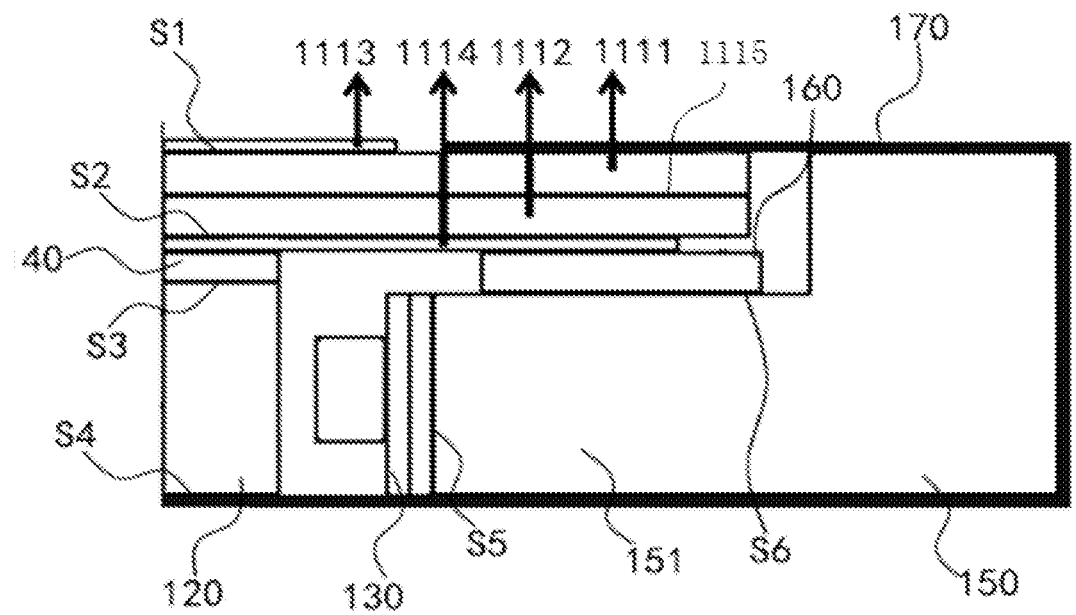
FIG. 3 is a cross-sectional view taken along line B-B in FIG. 1.
Figure 4:
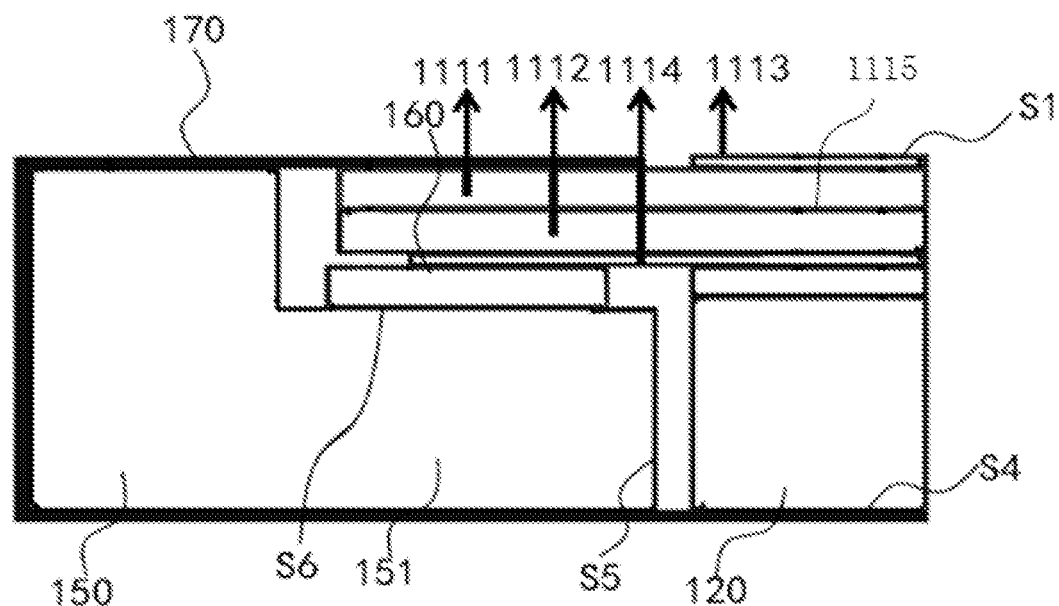
FIG. 4 is a cross-sectional view taken along line C-C in FIG. 1.
Figure 5:
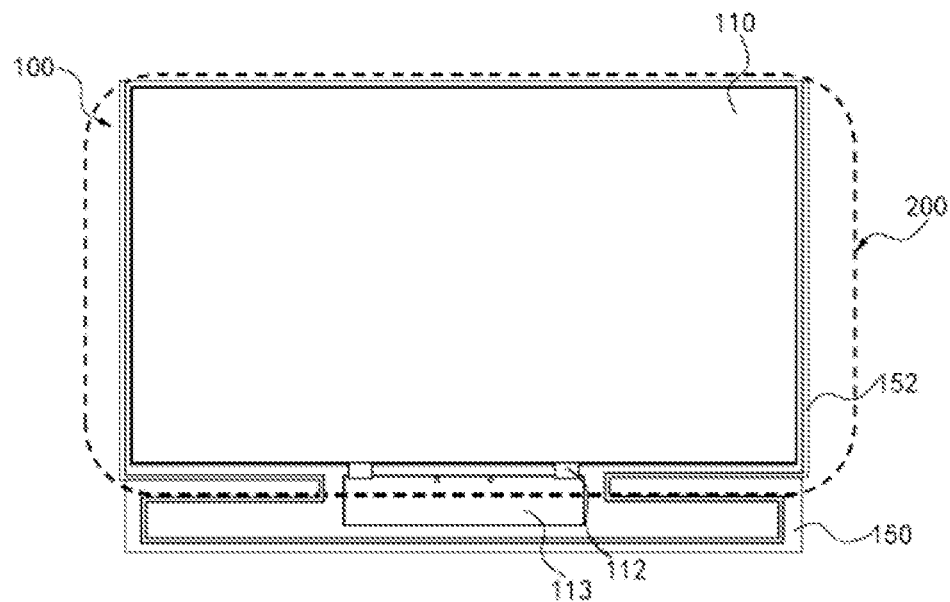
FIG. 5 is a schematic structural diagram showing a transparent display module according to another exemplary embodiment.

As shown in FIG. 1, in the present embodiment, the transparent display module 100 proposed in the present disclosure mainly includes two transparent substrates, a transparent display panel 110, a light guide plate 120 and a light source 130. Reference is further made in conjunction with FIG. 2 to FIG. 5. FIG. 2 shows a cross-sectional view taken along line A-A in FIG. 1; FIG. 3 shows a cross-sectional view taken along line B-B in FIG. 1; and FIG. 4 shows a cross-sectional view taken along line C-C in FIG. 1; FIG. 5 representatively shows a schematic structural diagram of another embodiment of the transparent display module 100 proposed in the present disclosure. The structure, connection mode and functional relationship of the main components of the transparent display module 100 proposed in the present disclosure will be described in detail below in conjunction with the above-mentioned drawings.

As shown in FIG. 1 and FIG. 2, in the present embodiment, the two transparent substrates mainly include a first transparent substrate 101 and a second transparent substrate 102 arranged opposite to each other, and a first cavity is formed between the two transparent substrates. The transparent display panel 110 is arranged between the first transparent substrate 101 and the second transparent substrate 102, that is, the transparent display panel 110 is received in the first cavity. The light guide plate 120 is arranged between the transparent display panel 110 and the second transparent substrate 102. The light source 130 is arranged between the transparent display panel 110 and the second transparent substrate 102, and arranged at the side of the light guide plate 120. By adopting the above design, the transparent display module 100 proposed in the present disclosure has a thinner device thickness. In addition, the transparent display module 100 can change a point light source as a surface light source through the light guide plate 120, thereby having a good display effect and application prospect, and achieving a transparent display function of displaying a picture on windows of vehicles such as trains and automobiles.

In some embodiments, as shown in FIG. 1, the two transparent substrates can adopt a structure of the hollow glass 200. Two glass plates disposed opposite to each other of the hollow glass 200 are the two transparent substrates, and a cavity formed between the two glass plates is the first cavity.

In some embodiments, as shown in FIG. 1 and FIG. 2, the transparent display panel 110 mainly includes an array substrate 1111, a color filter 1112, a first polarizer 1113, and a second polarizer 1114. Specifically, the transparent display panel 110 has a first surface S1 and a second surface S2 that are opposite to each other. The transparent display panel 110 is arranged in the first cavity of the hollow glass 200 with the first surface S1 being at a side wall of the first cavity (that is, the inner wall of the transparent substrate 101). The display module according to the present disclosure may further include a circuit board connected to the transparent display panel 110, and the circuit board is configured to drive the transparent display panel 110.

As shown in FIG. 3, in the present embodiment, the light guide plate 120 has a third surface S3 and a fourth surface S4 opposite to each other. The third surface S3 of the light guide plate 120 is arranged on the second surface S2 of the transparent display panel 110, and the fourth surface S4 of the light guide plate 120 is arranged on the other side wall of the first cavity of the hollow glass 200 (that is, the inner wall of the second transparent substrate 102). Further, the light source 130 is disposed between the second surface S2 of the transparent display panel 110 and the other side wall of the first cavity.

In some embodiments, the light source 130 is described by taking an LED light bar as an example. In other embodiments, light sources of other structures or types may also be selected, which is limited to this embodiment. As shown in FIG. 1, in the present embodiment, the circuit board mainly includes a flexible circuit board 112 and a printed circuit board 113. Specifically, the flexible circuit board 112 is connected to the transparent display panel 110 and can extend beyond the hollow glass 200. The printed circuit board 113 is connected to the flexible circuit board 112 and may be located outside the hollow glass 200.

In some embodiments, the transparent display panel 110 may include the array substrate 1111, the color filter 1112, the first polarizer 1113, and the second polarizer 1114, as shown in FIG. 2 to FIG. 4. In the present embodiment, a liquid crystal layer 1115 is further formed between the array substrate 1111 and the color filter 1112. The liquid crystal layer 1115 contains liquid crystal molecules. The orientation of the liquid crystal molecules changes with an electric field applied thereon, so that the transparency of the transparent display panel 110 changes, thereby realizing the display of different gray levels. Specifically, the array substrate 1111 has two opposite surfaces, and one of the surfaces may be defined as the first surface S1 of the transparent display panel 110. The color filter 1112 has two opposite surfaces, and one of the surfaces of the color filter substrate 1112 can be defined as the second surface S2 of the transparent display panel 110. Further, the other surface of the color filter 112 is arranged on the other surface of the array substrate 1111. The circuit board is connected to the color filter 1112. The first polarizer 1113 and the second polarizer 1114 are respectively arranged on the first surface S1 and the second surface S2, that is, two surfaces of the array substrate 1111 and the color filter 1112 facing away from each other.

In some embodiments, the third surface S3 of the light guide plate 120 and the second surface S2 of the transparent display panel 110 may be bonded to each other through a first adhesive layer 140 in the present embodiment, as shown in FIG. 3. The first adhesive layer 140 is made from a transparent material. Through the first adhesive layer 140, the connection relationship between the light guide plate 120 and the transparent display panel 110 can be optimized, and the transparent display effect of the transparent display module 100 can be ensured.

Further, based on the design that the light guide plate 120 and the transparent display panel 110 are bonded through the first adhesive layer 140. For example, in the present embodiment, the material of the first adhesive layer 140 may be liquid optical clear adhesive (OCR). In addition, the light guide plate 120 may be bonded to the transparent display panel 110 in a full lamination manner by the OCR adhesive. In other embodiments, when the first adhesive layer 140 uses other types of adhesives, the above-mentioned full lamination manner can also be adopted, which is not limited to the present embodiment.

As shown in FIG. 2, in some embodiments, the transparent display module 100 may include two light sources 130 (for example, two LED light bars). For example, the two light sources 130 may be located outside of the light guide plate 120, and located on opposite sides of the light guide plate 120. In other embodiments, there may also be one or more than two light sources 130, and the distribution position of the light sources 130 relative to the light guide plate 120 can also be flexibly adjusted according to the shape of the light guide plate 120 or other arrangements, which is not limited in the present embodiment.

In some embodiments, the transparent display module 100 may further include a heat dissipation frame 150, as shown in FIG. 1 to FIG. 4. Specifically, the heat dissipation frame 150 is approximately a closed frame structure, and disposed in periphery area of the transparent display panel 110 and the light guide plate 120. The inner periphery of the heat dissipation frame 150 has a first end surface S5 facing the side of the light guide plate 120. The light source 130 is disposed on the first end surface S5 and located between the side of the light guide plate 120 and the first end surface S5. The circuit board is disposed on the heat dissipation frame 150. Through the above design, the heat generated by the light source 130 and the transparent display panel 110 can be discharged through the heat dissipation frame 150, so that the transparent display module 100 has an excellent heat dissipation effect. In other embodiments, the heat dissipation frame 150 is not limited to the ring-closed frame structure of the present embodiment, and can also adopt multiple frame structures that surround the outer peripheries of the display panel and the light guide plate 120 and are spaced apart from each other.

Furthermore, as shown in FIG. 2 to FIG. 4, based on the design of the transparent display module 100 where the heat dissipation frame 150 is included, in the present embodiment, when the area of the second surface S2 of the transparent display panel 110 is larger than the area of the third surface S3 of the light guide plate 120, the outer edge of the transparent display panel 110 extends beyond the outer periphery of the light guide plate 120. For example, on the basis of such design, the inner periphery of the heat dissipation frame 150 may be provided with a protrusion 151. The protrusion 151 has the first end surface S5 and a second end surface S6 facing the second surface S2 of the transparent display panel 110. The outer edge of the transparent display panel 110 is arranged on the second end surface S6.

Furthermore, based on the design that the heat dissipation frame 150 is provided with the protrusion 151, the outer edge of the transparent display panel 110 and the second end surface S6 of the protrusion 151 of the heat dissipation frame 150 can be bonded through the second adhesive layer 160 in some embodiments, as shown in FIG. 3.

Furthermore, based on the design that the transparent display panel 110 and the protrusion 151 of the heat dissipation frame 150 are bonded through the second adhesive layer 160, the second adhesive layer 160 may be a very high bond (VHB) double sided adhesive tape in some embodiments.

Further, based on the design that the transparent display module 100 includes the heat dissipation frame 150, the material of the heat dissipation frame 150 may be aluminum in some embodiments. Through the above design, due to the metal characteristics of aluminum, the heat dissipation frame 150 not only has a good heat dissipation effect, but also has a lighter weight, which is beneficial for the transparent display module 100 to be light.

Furthermore, based on the design that the heat dissipation frame 150 is made from aluminum, the aluminum heat dissipation frame 150 may be formed through a brushed aluminum foil process in some embodiments.

In some example embodiments of the transparent display module 100 proposed in the present disclosure, as shown in FIG. 5, the heat dissipation frame 150 may further be provided with a heat pipe 152. Specifically, the heat pipe 152 may be disposed inside the heat dissipation frame 150. The heat pipe 152 may directly contact the heat dissipation frame 150. The heat pipe 152 may be disposed in the periphery of the circuit board. For example, the heat pipe 152 and the circuit board may be arranged spaced apart rather than being in direct contact. The heat pipe 152 is received with a heat-conducting medium, such as a cooling liquid. Through the above design, through the thermal conduction function of the heat conduction medium in the heat pipe 152, the heat conduction ability of the heat dissipation frame 150 with the heat pipe 152 is further optimized, thereby improving the heat dissipation effect of the transparent display module 100.

In some embodiments, based on the design that the transparent display module 100 includes the heat dissipation frame 150, the transparent display module 100 proposed in the present disclosure may further include an adhesive tape 170, as shown in FIGS. 3 and 4. Specifically, the adhesive tape 170 is disposed on the outer edge of the first surface S1 of the transparent display panel 110, the outer edge of the fourth surface S4 of the light guide plate 120 and the heat dissipation frame 150. The adhesive tape 170 can assist in fixing the transparent display panel 110, the heat dissipation frame 150 and the light guide plate 120 outside of them. Through the design that the adhesive tape 170 is included, the transparent display panel 110, the heat dissipation frame 150 and the light guide plate 120 can be auxiliary fixed.

It should be noted herein that the transparent display modules shown in the drawings and described in the specification are merely a few examples of various types of transparent display modules that can adopt the principles of the present disclosure. It should be clearly understood that the principle of the present disclosure is by no means limited to any details of the transparent display module or any component of the transparent display module shown in the drawings or described in the specification.

Figure 6:
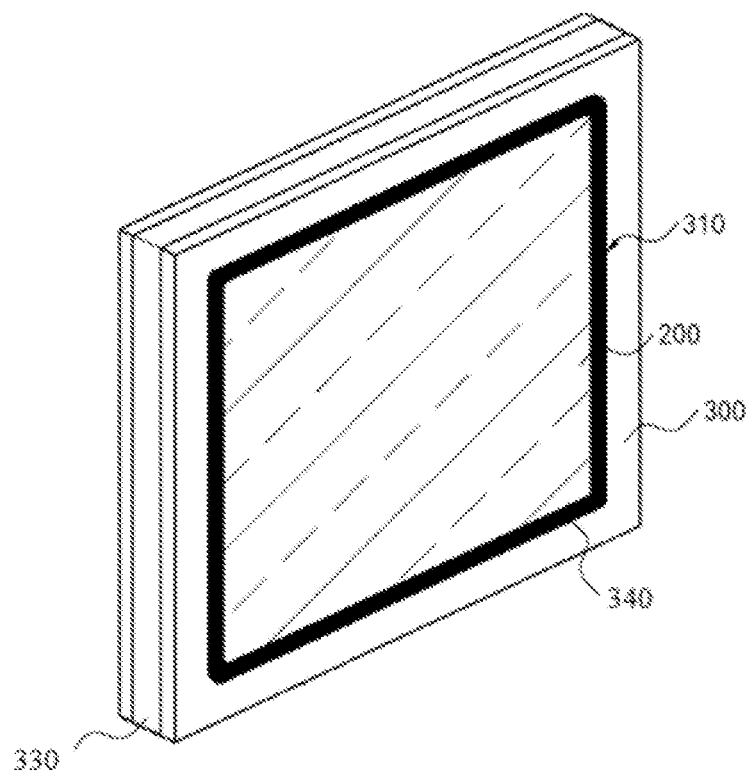
FIG. 6 is a partial schematic diagram showing a part located at a window in a wall structure of a display device according to an exemplary embodiment.

Reference is made to FIG. 6, which representatively shows a partial schematic diagram of the display device proposed in the present disclosure. In the exemplary embodiment, the display device proposed in the present disclosure is described by taking a display device disposed in a vehicle such as a high-speed train as an example. It is easy for those skilled in the art to understand that, in order to apply the relevant design of the present disclosure to other types of vehicles or other equipment, various modifications, additions, substitutions, deletions or other changes are made to the following specific embodiments. Such changes are still within the scope of the principle of the display device proposed in the present disclosure.

As shown in FIG. 6, in the present embodiment, the display device proposed in the present disclosure incudes a wall structure 300. Taking a high-speed train as an example, the wall structure 300 can be understood as a side wall, a roof or a partition board in a compartment and so on. The wall structure 300 is provided with a window 310. The window 310 is provided with the transparent display module 100 proposed in the present disclosure and described in detail in the above embodiments. Accordingly, when being applied to, for example, a high-speed train, the transparent display module 100 can be understood as a train window on the side wall, a skylight on the roof, or a glass window on the partition board in the compartment of the high-speed train.

In the present embodiment, the wall structure 300 includes a cavity, which is defined as a second cavity to be distinguished from the cavity of the hollow glass 200 (i.e., the first cavity). Specifically, the outer edge of the hollow glass 200 of the transparent display module 100 is disposed in the second cavity of the wall structure 300, and at least a part of the display area of the hollow glass 200 is located in the window 310. The description of the middle part of the hollow glass 200 can be understood as a part of the hollow glass 200 corresponding to the transparent display panel, or can be understood as a larger area including at least the above-mentioned part.

Further, in the present embodiment, based on the design that the transparent display module includes the heat dissipation frame (that is, the heat dissipation frame is arranged on the outer periphery of the transparent display panel and the light guide plate, the inner periphery of the heat dissipation frame has the first end surface facing the side of the light guide plate, the light source is arranged on the first end surface and between the side of the light guide plate and the first end surface, and the circuit board is arranged on the heat dissipation frame), the heat dissipation frame extends out of the first cavity from the side of the hollow glass 200 and is located in the second cavity of the wall structure 300.

Further, as shown in FIG. 6, in the present embodiment, a first sealant layer 330 is provided in the second cavity.

Specifically, since the transparent display module 100 is disposed in the wall structure 300, the first sealant layer 330 is approximately in a closed structure surrounding the transparent display module 100 and is sealed on both side walls of the second cavity(for example, the inner wall and the outer wall of the wall structure 300).

Further, as shown in FIG. 6, in the present embodiment, a second sealant layer 340 in a ring-shaped closed structure is sealed between the outer surface of the hollow glass 200 of the transparent display module 100 on the side close to the transparent display panel, the middle part of the hollow glass 200, and the edges of the window 310 of the wall structure 300.

It should be noted herein that the display device shown in the drawings and described in the specification are merely a few examples of various types of display devices that can adopt the principles of the present disclosure. It should be clearly understood that the principle of the present disclosure is by no means limited to any details of the display device or any component of the display device shown in the drawings or described in the specification.

In summary, the transparent display module proposed in the present disclosure includes two transparent substrates, a transparent display panel and a light source. The transparent display panel is arranged between the two transparent substrates. The light guide plate is arranged between the transparent display panel and one of the transparent substrates. The light source is arranged between the transparent display panel and one of the transparent substrates, and the light source is located on the side of the light guide plate. Through the above design, the transparent display module proposed in the present disclosure has a thinner device thickness. In addition, due to the light guide plate, the transparent display module can turn a point light source into a surface light source, thereby obtaining a good display effect and application prospect. Therefore, a transparent display function for displaying corresponding images on the windows of vehicles such as trains and cars can be achieved.

The exemplary embodiments of the transparent display module and the display device proposed by the present disclosure are described and/or illustrated in detail above. However, the embodiments of the present disclosure are not limited to the specific embodiments described herein, on the contrary, the components and/or steps of each embodiment can be used independently and separately from other components and/or steps described herein. Each component and/or step of one embodiment can also be used in combination with other components and/or steps of other embodiments. When the elements/components described and/or illustrated here are introduced, the terms "one", "a", "the", and "said" are used to indicate that there are one or more elements/components or the like. The terms "include", "contain" and "have" are used to indicate an open meaning of including and means that there may be additional elements/components/etc. In addition, the terms "first" and "second" etc. as used in the claims and description are used only as markers, and do not limit the number of objects.

Although the transparent display module and the display device proposed in the present disclosure has been described according to different specific embodiments, those skilled in the art will recognize that the implementation of the present disclosure can be modified within the spirit and scope of the claims.

What is claimed is:

1. A transparent display module, comprising:
   a first transparent substrate and a second transparent substrate that are arranged opposite to each other;

a transparent display panel arranged between the first transparent substrate and the second transparent substrate;

a light guide plate arranged between the transparent display panel and the second transparent substrate;

a light source arranged between the transparent display panel and the second transparent substrate, and the light source is located at a side of the light guide plate; and a heat dissipation structure, wherein the light source is arranged between the light guide plate and the heat dissipation structure, wherein the heat dissipation structure comprises a heat dissipation frame arranged on an outer periphery of the transparent display panel and the light guide plate, an inner periphery of the heat dissipation frame comprises a first end surface facing the side of the light guide plate, and the light source is disposed on the first end surface and is located between the side of the light guide plate and the first end surface, and the inner periphery of the heat dissipation frame is provided with a protrusion, the protrusion comprises the first end surface, a second end surface facing the transparent display panel, and a third end surface facing the second transparent substrate, an outer edge of the transparent display panel is disposed on the second end surface, and an outer edge of the second transparent substrate is disposed on the third end surface.

2. The transparent display module according to claim 1, wherein the heat dissipation structure further comprises a heat pipe that is in direct contact with the heat dissipation frame.

3. The transparent display module according to claim 2, wherein the heat pipe is disposed inside the heat dissipation frame.

4. The transparent display module according to claim 1, wherein the transparent display panel comprises: a first polarizer, an array substrate, a liquid crystal layer, a color filter, and a second polarizer that are stacked in sequence.

5. The transparent display module according to claim 2, further comprising:

a circuit board, disposed on a side of the heat dissipation frame facing a plane where the first transparent substrate is located, wherein the circuit board is configured to drive the transparent display panel, and the heat pipe is disposed in a peripheral area of the circuit board, and the heat pipe is spaced apart from the circuit board.

6. The transparent display module according to claim 1, wherein a cavity is formed between the first transparent substrate and the second transparent substrate, and the transparent display panel is received in the cavity.

7. The transparent display module according to claim 6, wherein the light source is arranged between the transparent display panel and a wall of the cavity.

8. The transparent display module according to claim 1, wherein the light guide plate and the transparent display panel are bonded to each other through an adhesive layer.

9. The transparent display module according to claim 8, wherein the adhesive layer comprises liquid optical clear adhesive.

10. The transparent display module according to claim 1, wherein the heat dissipation frame comprises multiple frame structures that surround outer peripheries of the transparent display panel and the light guide plate and are spaced apart to each other.

11. The transparent display module according to claim 1, wherein the outer edge of the transparent display panel and the second end surface of the protrusion of the heat dissipation frame are bonded through an adhesive layer.

12. The transparent display module according to claim 11, wherein the adhesive layer comprises a very high bond double sided adhesive tape.

13. The transparent display module according to claim 1, further comprising an adhesive tape for auxiliary fixing the transparent display panel, the heat dissipation structure, and the light guide plate from an outside of the transparent display panel, the heat dissipation structure, and the light guide plate.

14. A display device, comprising:

a wall structure provided with a window, wherein the window is provided with a transparent display module, the transparent display module, comprising:

a first transparent substrate and a second transparent substrate that are arranged opposite to each other;

a transparent display panel arranged between the first transparent substrate and the second transparent substrate;

a light guide plate arranged between the transparent display panel and the second transparent substrate;

a light source arranged between the transparent display panel and the second transparent substrate, and the light source being located at a side of the light guide plate; and a heat dissipation structure, wherein the light source is arranged between the light guide plate and the heat dissipation structure, wherein the heat dissipation structure comprises a heat dissipation frame arranged on an outer periphery of the transparent display panel and the light guide plate, an inner periphery of the heat dissipation frame comprises a first end surface facing the side of the light guide plate, and the light source is disposed on the first end surface and is located between the side of the light guide plate and the first end surface, and the inner periphery of the heat dissipation frame is provided with a protrusion, the protrusion comprises the first end surface, a second end surface facing the transparent display panel, and a third end surface facing the second transparent substrate, an outer edge of the transparent display panel is disposed on the second end surface, and an outer edge of the second transparent substrate is disposed on the third end surface.

15. The display device according to claim 14, wherein the wall structure comprises a cavity, an outer edge of the transparent display module is arranged in the cavity, and at least a part of display area of the transparent display module is located in the window.

16. The display device according to claim 15, wherein a first sealant layer is provided in the cavity, and the first sealant layer is in a closed structure surrounding an outer periphery of the transparent display module and is provided between both side walls of the cavity; and/or, a second sealant layer having a ring-shaped closed structure is provided between the transparent display module and edge portions of the window defined in the wall structure.

17. The display device according to claim 16, wherein a second sealant layer having a ring-shaped closed structure is provided between the transparent display module and edge portions of the window defined in the wall structure.

18. The display device according to claim 15, wherein a second sealant layer having a ring-shaped closed structure is provided between the transparent display module and edge portions of the window defined in the wall structure.

19. A method, comprising:
providing a transparent display module, the transparent display module comprising:
- a first transparent substrate and a second transparent substrate that are arranged opposite to each other;
- a transparent display panel arranged between the first transparent substrate and the second transparent substrate;
- a light guide plate arranged between the transparent display panel and the second transparent substrate;
- a light source arranged between the transparent display panel and the second transparent substrate, and the light source is located at a side of the light guide plate; and
- a heat dissipation structure, wherein the light source is arranged between the light guide plate and the heat dissipation structure, wherein the heat dissipation structure comprises a heat dissipation frame arranged on an outer periphery of the transparent display panel and the light guide plate, an inner periphery of the heat dissipation frame comprises a first end surface facing the side of the light guide plate, and the light source is disposed on the first end surface and is located between the side of the light guide plate and the first end surface, and the inner periphery of the heat dissipation frame is provided with a protrusion, the protrusion comprises the first end surface, a second end surface facing the transparent display panel, and a third end surface facing the second transparent substrate, an outer edge of the transparent display panel is disposed on the second end surface, and an outer edge of the second transparent substrate is disposed on the third end surface.

* * * * *